(12) United States Patent
Kitabayashi

(10) Patent No.: US 7,172,291 B2
(45) Date of Patent: Feb. 6, 2007

(54) ELECTRONIC APPARATUS AND COOLING MEDIUM REPLACEMENT CARTRIDGE

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 11/091,381

(22) Filed: Mar. 29, 2005

(65) Prior Publication Data

US 2005/0219471 A1    Oct. 6, 2005

(30) Foreign Application Priority Data

Apr. 2, 2004    (JP)    ............... 2004-110399

(51) Int. Cl.
  G03B 21/16    (2006.01)
  G03B 21/18    (2006.01)
  G03B 21/26    (2006.01)
(52) U.S. Cl. .......................... 353/54; 353/52
(58) Field of Classification Search ................ 353/54, 353/52, 58; 359/358
  See application file for complete search history.

(56) References Cited

FOREIGN PATENT DOCUMENTS

| JP | A 1-159684 | 6/1989 |
|---|---|---|
| JP | A 4-54778 | 2/1992 |

*Primary Examiner*—Melissa Jan Koval
*Assistant Examiner*—Andrew Kong
(74) *Attorney, Agent, or Firm*—Oliff & Berridge, PLC

(57) ABSTRACT

An electronic apparatus including a first tube system (641) that guides the cooling medium from the cooling medium storage section (62) to the components to be cooled; a second tube system (642) that sends back the cooling medium having been used for cooling the components to be cooled to the cooling medium storage section (62); and a medium circulator (63) that is disposed on the first tube system (641) or second (642) in order to circulate the cooling medium through the cooling medium storage section (62), first tube system (641), and second tube system (642). Tube joints (6412) (6422) that is exposed to the outside of the casing (2), to which a cooling medium replacement cartridge (7) used for replacing the cooling medium in the cooling medium storage section with a new cooling medium is connected are provided in the first tube system (641) and/or second tube system.

10 Claims, 10 Drawing Sheets

ELECTRONIC APPARATUS AND COOLING MEDIUM REPLACEMENT CARTRIDGE

BACKGROUND OF THE INVENTION

1. Field of the Invention

The present invention relates to an electronic apparatus including a main body of the apparatus and a case for housing the main body and further including, inside of the apparatus, a cooling unit that circulates a liquid cooling medium to cool components constituting the main body, and a cooling medium replacement cartridge used for the electronic apparatus.

2. Description of Related Art

Projectors have been used for presentation in meetings, academic conferences, exhibitions, or the like, or to watch movies at home. A projector of this type includes a light source, a optical modulator that modulates a light beam emitted from the light source in accordance with image information to form an optical image, and an optical device disposed on the upstream and downstream of the optical modulator and having a plurality of optical components that perform optical conversion of an incident light beam. The projector forms an optical image and projects the image in an enlarged manner by the optical device.

With the increase in the luminance of the projector and reduction in the size thereof, the temperature of the optical modulator and optical components disposed in the projector has been being increased remarkably in recent years. In addition, the optical modulator and optical components are easily affected by heat and therefore subject to heat deterioration. The heat deterioration of the optical modulator and optical components may adversely affect formation of an optical image to pose a problem for the maintenance of functions of the projector. To cope with this problem, an air-cooling type cooling system that sends a cooling air using a fan or the like has been generally used in the conventional projector. However, the air-cooling type has a limitation in its heat radiation capability and needs to rotate the fan at high-speed or needs to use a large-sized fan for the purpose of assuring required air volume, impeding reduction of noise and size of the projector. Therefore, a new cooling system that effectively cools the optical modulator and optical components has been considered.

A projector in which an optical component (polarization plate) includes a liquid cooling section is known as a cooling system that solves the above problem (for example, see Reference: Japanese Patent Laid-Open Publication No. Hei 4-54778). The projector disclosed in the Reference includes a liquid cooling section constituted by a frame body with two transparent panels disposed in the passage of a light beam. A cooling medium (cooling liquid) such as ethylene glycol is filled up in the frame body. In a state of being attached to a polarization plate, the liquid cooling section cools the heat of the polarization plate. Since liquid has a higher specific heat and higher transfer capability than air, the projector using the liquid cooling section not only effectively cools the polarization plate but also contributes reduction of noise because fan rotation noise and wind noise are not generated.

In the projector disclosed in the Reference, an optical image is formed based on the light beam that has been transmitted through the cooling medium disposed on an illumination optical axis. Accordingly, if discoloration of the cooling medium is caused due to aging degradation, heat degradation, or the like, or if impurities are introduced into the cooling medium, the discoloration and introduced impurities adversely affect a projection image. In this case, therefore, it is necessary to replace the cooling medium with a new one. However, complicated works such as disassembly of the projector are required to replace the cooling medium.

SUMMARY OF THE INVENTION

An object of the present invention is to provide an electronic apparatus and a cooling medium replacement cartridge allowing a simple operation in replacement of a cooling medium.

According to an aspect of the present invention, there is provided an electronic apparatus including an apparatus main body and a casing for housing the main body, and further including, inside of the apparatus, a cooling unit that circulates a liquid cooling medium to cool components constituting the main body, including: a cooling medium storage section that is provided inside of the casing and stores the cooling medium; a first tube system that guide the cooling medium from the cooling medium storage section to the components to be cooled; a second tube system that sends back the cooling medium having been used for cooling the components to be cooled to the cooling medium storage section; and a medium circulator that is disposed on the first or second tube system in order to circulate the cooling medium through the cooling medium storage section, first tube system, and second tube system, in which tube joints that are exposed to the outside of the casing, to which a cooling medium replacement cartridge used for replacing the cooling medium in the cooling medium storage section with a new cooling medium is connected are provided in the first and/or second tube systems.

According to the present invention, by connecting the cooling medium replacement cartridge to the tube joints provided in the first and/or second tube systems, the cooling medium in the cooling medium storage section can be replaced with a new cooling medium through the tube joints. Since the tube joints are exposed to the outside of the casing of the electronic apparatus, the cooling medium replacement cartridge can be attached from the outside of the casing. Thus, there is no need to attach the cooling medium replacement cartridge to the inside of the electronic apparatus and thereby no need to disassemble the electronic apparatus, so that replacement of the cooling medium can be easily performed. Therefore, the electronic apparatus allowing a simple operation in replacement of the cooling medium can be provided.

In the present invention, it is preferable that the tube joints are disposed on the first or second tube system, and that one of the tube joints serves as a discharge tube joint for discharging the cooling medium in the cooling medium storage section and the other serves as a supply tube joint for supplying the cooling medium storage section with a new cooling medium from the cooling medium replacement cartridge.

According to the present invention, by providing, as tube joints, the discharge tube joint for discharging the cooling medium and the supply tube joint for supplying a new cooling medium, it is possible to supply the first and second tube systems with the new cooling medium or air through the supply tube joint at the time of discharging the cooling medium distributed in the first and second tube systems from the discharge tube joint. At the time of supplying the new cooling medium through the supply tube joint, the new cooling medium or air that has been supplied at the time of discharging cooling medium is discharged through the discharge tube joint with this configuration, it is possible to smoothly perform the discharge of the cooling medium from the discharge tube joint and supply of the new cooling medium through the supply tube joint. Further, it is possible to suppress pressure change within the first and second tube systems and cooling medium storage section, which is associated with the discharge of the cooling medium. Therefore, it is possible to smoothly perform the replacement of the cooling medium and to suppress the pressure change at the time of replacing the cooling medium, thereby preventing breakage/damage of the components.

Further, by individually providing the discharge tube joint and supply tube joint, a new cooling medium can be supplied to the tube systems simultaneously with the discharge of the cooling medium. In this case, the replacement of the cooling medium can be performed in a short period of time.

In the present invention, it is preferable that the discharge tube joint is disposed on the upstream of a flow path relative to the supply tube joint.

According to the present invention, the tube joints are disposed in the order of the discharge tube joint and supply tube joint viewed in the feeding direction from the medium circulator. In this configuration, the cooling medium that has been stored in the cooling medium storage section is delivered under pressure by the medium circulator and discharged from the discharge tube joint. Further, a new cooling medium can be distributed in the cooling medium storage section through the supply tube joint without being discharged from the discharge tube joint quickly. Therefore, it is possible to discharge substantially all cooling medium stored in the tube systems and cooling medium storage section and to fill the tube systems and cooling medium storage section with a new cooling medium.

In the present invention, it is preferable that the electronic apparatus include: a flow path switch section that is disposed between the supply and discharge tube joints on the second tube system to switch flow paths between a flow path directed to the cooling medium storage section and a flow path directed to the discharge tube joint; a liquid level detection section that is disposed on the second tube system to detect the liquid level of the cooling medium discharged through the discharge tube joint; a full level detection section that is provided in the cooling medium storage section to detect whether the cooling medium storage section is filled up with the cooling medium; and a controller that controls drive of the medium circulator and switching operation of the flow path switch section, in which the controller including: sets the flow path switch section to the flow path directed to the discharge tube joint after the cooling medium replacement cartridge has been attached; drives the medium circulator to circulate the cooling medium; circulates the cooling medium in the cooling medium replacement cartridge after the liquid level detection section has detected that the liquid level of the cooling medium discharged through the discharge tube joint is 0; sets the flow path switch section to the flow path directed to the cooling medium storage section after the full level detection section has detected that the cooling medium storage section is filled up with the cooling medium; and stops the drive of the medium circulator.

According to the present invention, the controller controls switching operation of the flow path switch section, so that the flow paths for discharging and supplying the cooling medium can be individually obtained. Further, the controller controls drive of the medium circulator, so that the cooling medium can be discharged and supplied. Therefore, it is possible to automatically perform the replacement of the cooling medium under the control of the controller.

The liquid level detection section provided in the discharge tube joint detects the liquid level of the cooling medium distributed in the discharge tube joint, so that it is possible to detect that substantially all cooling medium has been discharged. Further, the full level detection section provided in the cooling medium storage section detects that the cooling medium storage section has been filled up with a new cooling medium. Therefore, the discharge and supply of the cooling medium can reliably be performed. Further, the controller can control the flow path switch section based on the detection results of the liquid level detection section and full level detection section, so that it is possible to perform the replacement of the cooling medium further reliably and in a short period of time.

The replacement of the cooling medium is not started until the cooling medium replacement cartridge has been attached. This prevents the cooling medium distributed inside of the electronic apparatus from being leaked outside the apparatus, increasing the quality of the electronic apparatus.

In the present invention, the electronic apparatus mentioned earlier is a projector including an optical modulator, as a component to be cooled, that modulates a light beam emitted from a light source in accordance with image information to form an optical image.

According to the present invention, as described above, the cooling medium circulated in the projector can easily be replaced. When the cooling medium distributed around the optical modulator to cool the optical modulator, degradation of the cooling medium leads to degradation of the optical image formed by the optical modulator. Therefore, the replacement of the cooling medium prevents the degradation of the optical image due to the degradation of the cooling medium or the like. Even if the cooling medium has been degraded, the degradation of the cooling efficiency can be prevented by replacing the cooling medium.

According to another aspect of the present invention, there is provided a cooling medium replacement cartridge that is attached to the above described electronic apparatus of the present invention and used for replacing the cooling medium in the electronic apparatus with a new cooling medium, including: connecting sections to be connected to tube joints exposed to the casing of the electronic apparatus, a first storage section that is connected to the connecting sections through tubes and stores the cooling medium sucked from the cooling medium storage section of the electronic apparatus, and a second storage section that is connected to the connecting sections through other tubes and stores a new cooling medium to be supplied to the electronic apparatus.

According to the present invention, the cooling medium circulated in the electronic apparatus can be replaced with a new one using one cooling medium replacement cartridge. In other words, the first storage section into which the cooling medium is discharged and second storage section that stores a new cooling medium are provided in one cooling medium replacement cartridge. By connecting the connecting sections connected to the first and second storage sections to the tube joints of the electronic apparatus, the replacement of the cooling medium can be performed. The replacement of the cooling medium is performed by connecting the cooling medium replacement cartridge to the tube joints exposed to the outside of the electronic apparatus, so that replacement operation of the cooling medium can be simplified.

DETAILED DESCRIPTION OF THE PREFERRED EMBODIMENTS

[First Exemplary Embodiment]

A first exemplary embodiment of the present invention will be described below with reference to the attached drawings.

(1) Primary Structure of Projector

Figure 1:
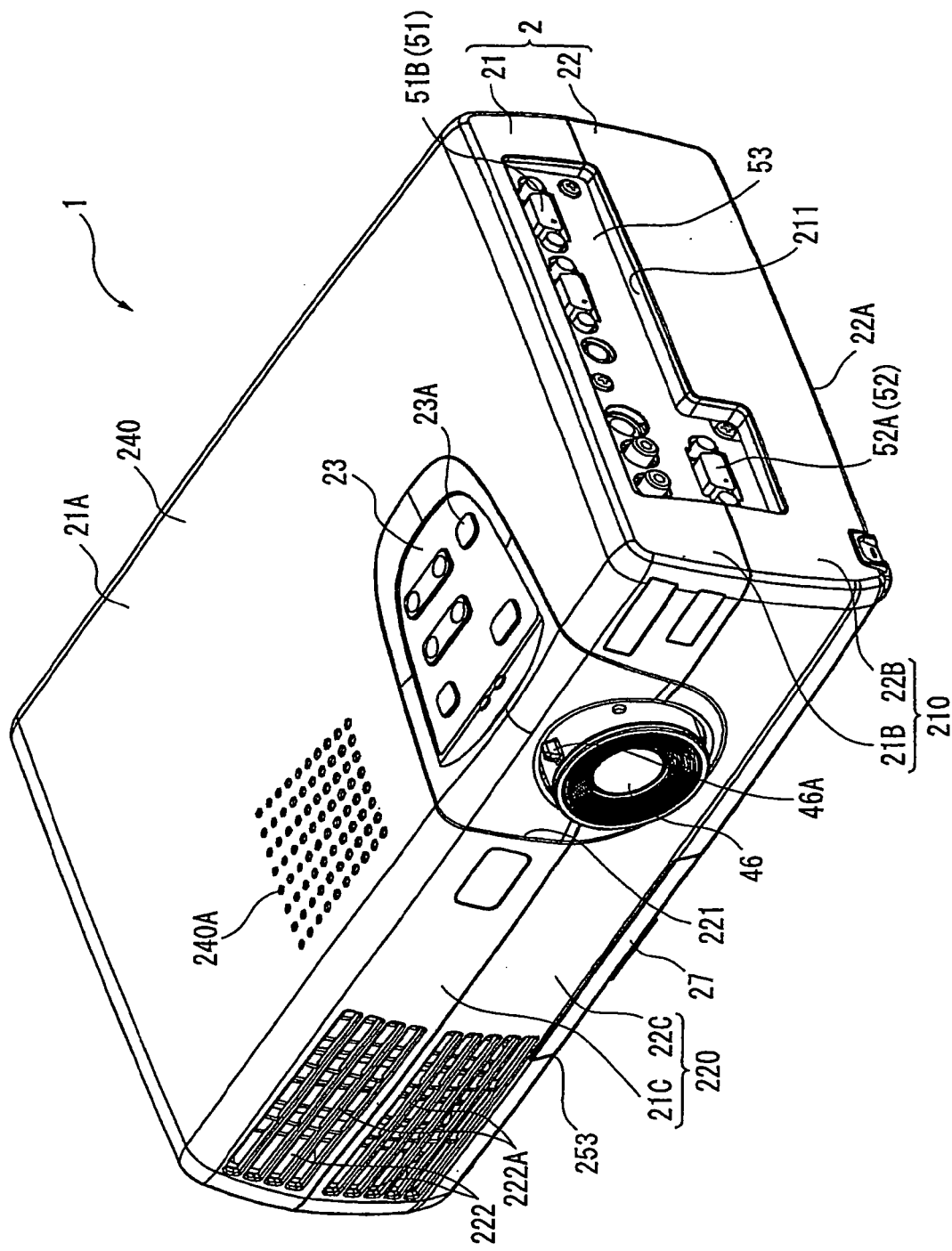
FIG. 1 is a perspective view of a projector according to a first exemplary embodiment of the present invention as viewed from upper front side thereof.
Figure 2:
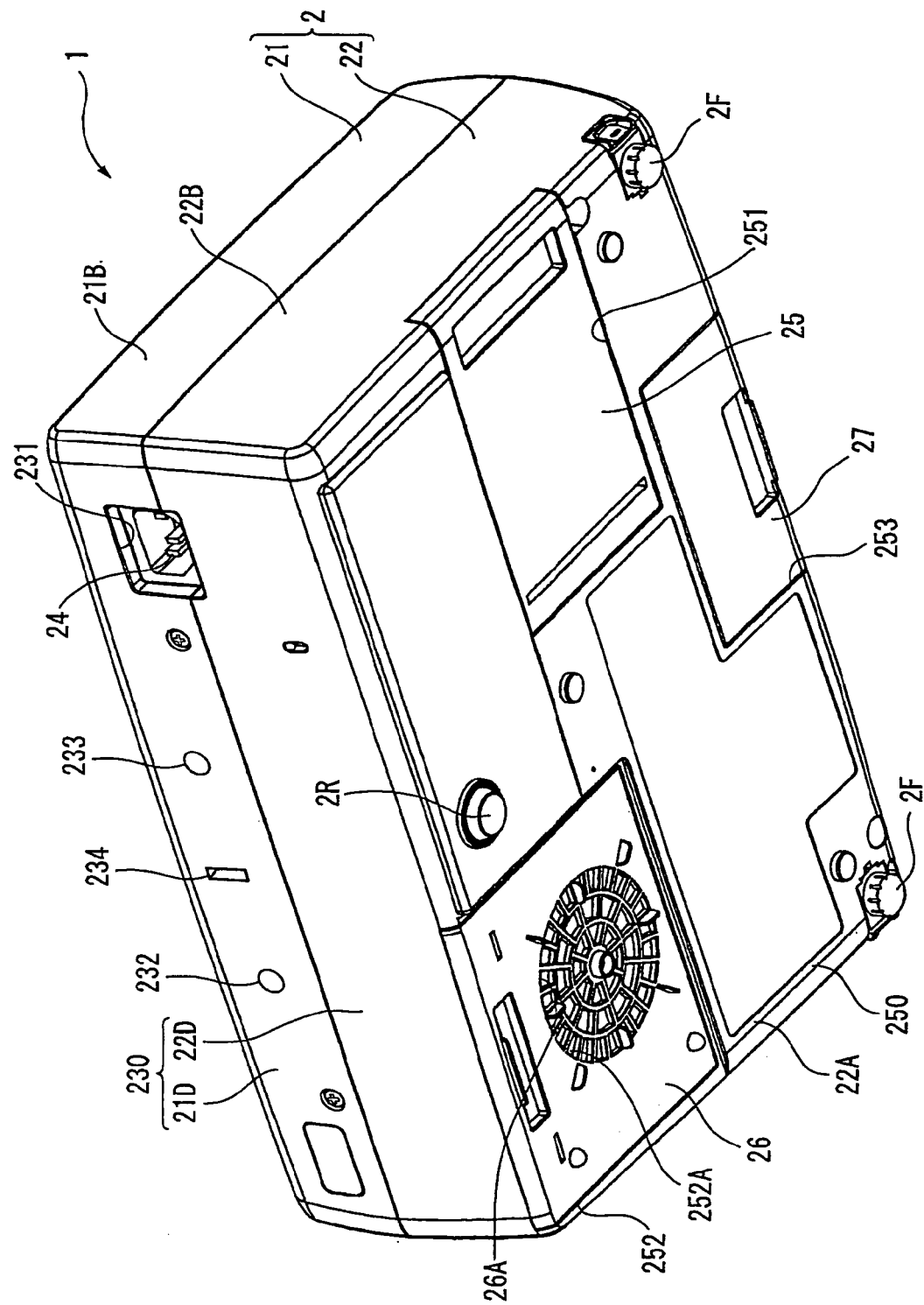
FIG. 2 is a perspective view of the projector according to the exemplary embodiment as viewed from lower rear side thereof.

FIG. 1 is a perspective view of a projector 1 according to the present invention as viewed from upper front side thereof, and FIG. 2 is a perspective view of the projector 1 as viewed from lower rear side thereof.

As shown in FIG. 1 or 2, the projector 1 includes a substantially rectangular parallelepiped exterior case 2 formed by injection molding. The exterior case 2 is a casing made of synthetic resin and houses an optical unit 4 (FIG. 3) that forms an optical image, a control board (not shown) including a controller that controls drive of the projector 1, a power supply unit (not shown), and a cooling unit 6 that cools components in the projector 1. The exterior case 2 is constituted by an upper case 21 and lower case 22, which are detachably attached to each other.

As shown in FIGS. 1 and 2, the upper case 21 is constituted by an upper surface 21A, side surfaces 21B, front surface 21C and rear surface 21D respectively serving as an upper surface, side surfaces, front surface, and rear surface of the projector 1.

Likewise, the lower case 22 is constituted by a lower surface 22A, side surfaces 22B, front surface 22C and rear surface 22D respectively serving as a lower surface, side surfaces, front surface, and rear surface of the projector 1.

In the rectangular parallelepiped exterior case 2, when the side surfaces 21B of the upper case 21 and the side surfaces 22B of the lower case 22 are connected to each other, side portions 210 of the rectangular parallelepiped are obtained. Likewise, connection of the front surfaces 21C and 22C forms a front portion 220 of the rectangular parallelepiped, connection of the rear surfaces 21D and 22D forms a rear portion 230, the upper surface 21A serves as an upper portion 240, and the lower surface 22A serves as a lower portion 250.

On the upper portion 240, as shown in FIG. 1, an operation panel 23 is provided at the front side and speaker holes 240A for voice output are arranged near the operation panel 23. Various switches for performing activation/control of the projector 1 are provided in the operation panel 23. Among them, a cooling medium replacement switch 23A for performing a replacement of a cooling medium in a cooling unit 6 to be described later is included.

An opening 211 is formed on the right side portion 210 (as viewed from the front of the projector 1) in such a manner to span the side surfaces 21B and 22B. The control board (not shown) that controls the operation of the projector 1 and an interface board 52 are provided in the exterior case 2. A connecter 51B mounted on the control board and a connector 52A mounted on the interface board 52 are exposed to the outside of the projector 1 through an interface panel 53 attached to the opening 211. The projector 1 is connected to exterior electronic apparatus or the like through the connectors 51B and 52A.

A circular opening 221 is formed at the right side (as viewed from the front) near the operation panel 23 on the front portions 220 in such a manner to span the two front surfaces 21C and 22C. A projection lens 46 is disposed in the exterior case 2 at a position corresponding to the opening 221 with its tip end thereof exposed to the outside through the opening 221. By manually operating a lever 46A formed on the exposed portion, focusing operation of the projection lens 46 can be performed.

An exhaust opening 222 is formed at a position opposite to the opening 221 on the front portions 220. The exhaust opening 222 is covered by a safety cover 222A.

As shown in FIG. 2, a rectangular opening 231 is formed at the right side (as viewed from the rear) on the rear portions 230. An inlet connector 24 is exposed to the outside through the opening 231.

Substantially circular shaped openings 232 and 233 are formed substantially at the center of the rear portions 230. A substantially rectangular opening 234 is formed between the openings 232 and 233. A cooling medium replacement cartridge 7 to be described later (FIGS. 4 and 6) is connected to the openings 232 to 234. A cartridge detection sensor 2341 (FIG. 7) that detects whether the cartridge 7 is connected is disposed on the inner side of the opening 234. The cartridge detection sensor 2341 is connected to a controller 67 (FIG. 7). When the cartridge 7 is connected, the cartridge detection sensor 2341 outputs an electrical signal indicating the connection status to the controller 67.

A rectangular opening 251 is formed on at the center of the right side of the lower portion 250 (as viewed from the below). A lamp cover 25 for covering the opening 251 is detachably attached to the opening 251. By detaching the lamp cover 25, a light source lamp (not shown) can easily be replaced with a new one.

A rectangular area 252 which is slightly dented is formed on the lower surface portion 250 at the left rear corner (as viewed from the below). An intake vent 252A for introducing cooling air from the outside is formed on the rectangular area 252. An intake vent cover 26 for covering the rectangular area 252 is detachably attached to the rectangular area 252. An opening 26A corresponding to the intake vent 252A is formed on the intake vent cover 26. An air filter (not shown) is provided on the opening 26A to prevent dust from entering the inside of the projector 1.

A rear leg 2R constituting a leg portion of the projector 1 is formed substantially at the center of the rear side of lower portion 250. Front legs 2F constituting the leg portion of the projector 1 are formed at the right and left corners on the front side of the lower surface 22A. That is, the projector 1 is supported by three points: rear leg 2R, and two front legs 2F.

Each of the two legs 2F can advance or retreat in the vertical direction. This configuration enables adjustment of the tilt (posture) of the projector 1 in a front-and-rear direction and a left-and-right direction, thereby adjusting the position of a projection image.

As shown in FIGS. 1 and 2, a rectangular parallelepiped recess 253 is formed substantially at the center of the front side of the exterior case 2 in such a manner to span the lower portion 250 and front portion 220. A cover member 27 for covering the lower and front sides of the recess 253 is attached to the recess 253 so as to be slidable in the front-and-rear direction. A remote controller (not shown) for remote control operation of the projector 1 is housed in the recess 253 in a state where the cover member 27 has been attached.

(2) Structure of Optical Unit

Figure 3:
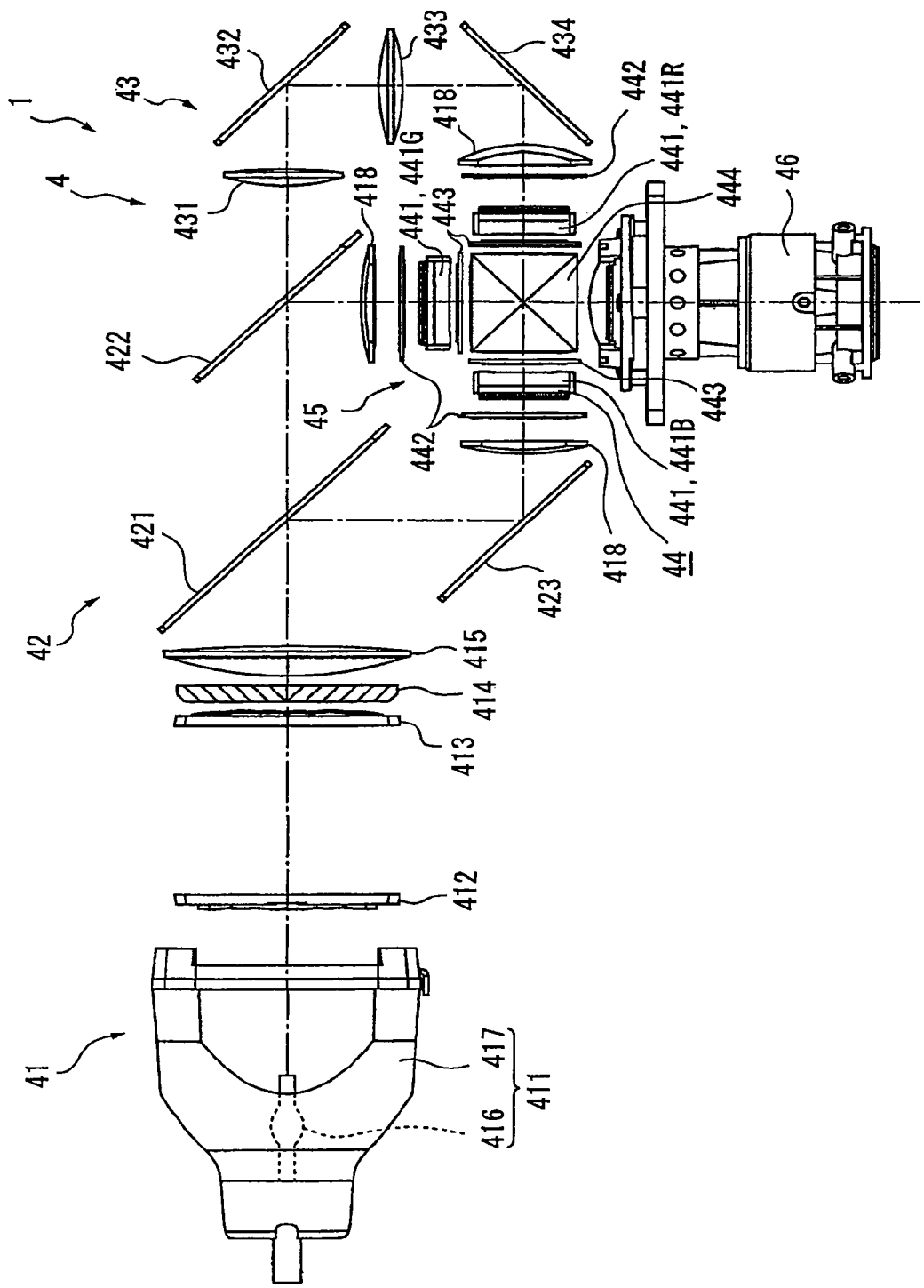
FIG. 3 is a schematic view showing a configuration of an optical unit according to the exemplary embodiment.

FIG. 3 is a schematic view showing a configuration of the optical unit 4.

As shown in FIG. 3, the optical unit 4 is housed in the aforementioned exterior case 2 and optically processes the light beam emitted from a light source lamp 416 that constitutes a light source 411 to form an optical image in accordance with image information and projects the image in an enlarged manner.

The optical unit 4 includes an integrator illuminating optical system 41, a color separating optical system 42, a relay optical system 43, a prism unit 44, the projection lens 46, and an optical component casing (not shown) that houses the optical components 41 to 44, and 46.

The integrator illuminating optical system 41 is an optical system for substantially uniformly illuminating the image formation area of three liquid crystal panels 441 (liquid crystal panel for red color 441R, liquid crystal panel for green color 441G, and liquid crystal panel for blue color 441B) constituting the prism unit 44, the integrator illuminating optical system 41 including the light source 411, a first lens array 412, a second lens array 413, a polarization converter 414, and a superposing lens 415.

The light source 411 includes the light source lamp 416 as a radial light source and a reflector 417. The radial light beam emitted from the light source lamp 416 is reflected by the reflector 417 to be a parallel light beam, and the parallel light beam is then irradiated to the outside. A high-pressure mercury lamp is used as the light source lamp 416. A metal halide lamp, a halogen lamp and the like can be used as well as the high-pressure mercury lamp. A parabolic mirror is used as the reflector 417. Alternatively, a combination of an ellipsoidal mirror and a parallelizing concave lens may be used instead of the parabolic mirror.

The first lens array 412 has small lenses arranged in a matrix, the lenses having substantially rectangular profile viewed in an illumination optical axis direction. The respective small lenses separate the light beam emitted from the light source lamp 416 into a plurality of sub-beams. The profile of each small lens is substantially similar to that of the image formation area of the liquid crystal panels 441.

The second lens array 413 is arranged approximately in the same manner as the first lens array 412, which includes small lenses arranged in a matrix. The second lens array 413 focuses the image of the small lenses of the first lens array 412 onto liquid crystal panels 441 together with the superposing lens 415.

The polarization converter 414 is disposed between the second lens array 413 and superposing lens 415. The polarization converter 414 converts the light from the second lens array 413 into substantially uniform polarized light, thereby enhancing the light utilization efficiency of the prism unit 44.

Specifically, the respective sub-beams converted into substantially uniform polarized light by the polarization converter 414 are substantially superposed on the liquid crystal panels 441 of the prism unit 44 by the superposing lens 415. Since only one-type of polarized light can be used in the projector 1 using the liquid crystal panels 441 that modulate polarized light, approximately half of the light beam from the light source lamp 416 emitting random polarized light cannot be used. Accordingly, with the use of the polarization converter 414, all of the light beams emitted from the light source lamp 416 are converted into substantially uniform polarized light to enhance the light utilization efficiency of the prism unit 44. Incidentally, such polarization converter 414 is disclosed in, for instance, Japanese Patent Laid-Open Publication No. Hei 8-304739.

The color-separating optical system 42 has two dichroic mirrors 421 and 422, and a reflection mirror 423. The plurality of sub-beams emitted from the integrator illuminating optical system 41 are separated into three color lights of red (R), green (G) and blue (B) by the two dichroic mirrors 421 and 422.

The relay optical system 43 has an incident-side lens 431, a relay lens 433, and reflection mirrors 432 and 434. The relay optical system 43 guides the color light (red light) separated by the color-separating optical system 42 toward the liquid crystal panel 441R.

At this time, the dichroic mirror 421 of the color-separating optical system 42 transmits the red light and green light of the light beam emitted from the integrator illuminating optical system 41 and reflects the blue light. The blue light reflected by the dichroic mirror 421 is reflected by the reflection mirror 423, and reaches the liquid crystal panel 441B for blue color through a field lens 418. The field lens 418 converts the respective sub-beams emitted from the second lens array 413 into a light beam parallel to the central axis (main beam). The field lenses 418 provided on the light-incident side of the other liquid crystal panels 441G and 441R function in the same manner.

In the red and green lights transmitted through the dichroic mirror 421, the green light is reflected by the dichroic mirror 422, which reaches the liquid crystal panel 441G for green light through the field lens 418. On the other hand, the red light transmits through the dichroic mirror 422, and passes through the relay optical system 43 to reach the liquid crystal panel 441R for red light through the field lens 418.

Incidentally, the relay optical system 43 is used for the red light in order to avoid deterioration in the light utilization efficiency on account of light dispersion and the like caused by the longer length of the optical path of the red light than the optical path of the other color lights. In other words, the relay optical system 43 is used for directly transmitting the sub-beams incident on the incident-side lens 431 to the field lens 418. Note that, though the red light of the three color lights passes through the relay optical system 43, the blue light, for instance, may alternatively pass through the relay optical system 43.

The prism unit 44 modulates the incident light beam in accordance with image information to form a color image.

The prism unit 44 has three incident-side polarization plates 442 on which the respective color lights separated by the color-separating optical system 42 are incident, the liquid crystal panels 441R, 441G and 441B (optical modulators) on the downstream of the respective incident-side polarization plates 442, irradiation-side polarization plates 443 disposed on the downstream of the respective liquid crystal panels 441R, 441G and 441B, and a cross dichroic prism 444 (color-combining optical system).

Each of the liquid crystal panels 441R, 441G and 441B uses, for instance, a polysilicon TFT as a switching element.

In the prism unit 44, the respective color lights separated by the color-separating optical system 42 are modulated by the three liquid crystal panels 441R, 441G, and 441B, incident-side polarization plates 442, and irradiation-side polarization plates 443 in accordance with image information to form an optical image.

The incident-side polarization plates 442 transmit only a polarized light in a predetermined direction out of the respective color lights separated by the color-separating optical system 42 and absorb the other light beam, which have a substrate made of sapphire glass and the like with a polarization film attached thereon. Alternatively, the polarization film may be attached to the field lens 418, without using the substrate.

The irradiation-side polarization plates 443 is arranged in a manner substantially same as the incident-side polarization plates 442, which transmit only the polarized light in a predetermined direction out of the light beams emitted from the liquid crystal panels 441 (441R, 441G and 441B) and absorb the other light beam. The polarization film may be attached to the cross dichroic prism 444, without using the substrate.

The polarization axis of the irradiation-side polarization plate 443 and the polarization axis of the incident-side polarization plate 442 are orthogonal to each other.

The cross dichroic prism 444 combines the optical image emitted from the irradiation-side polarization plate 443 and modulated for each color light to form a color image.

In the cross dichroic prism 444, a dielectric multi-layer film for reflecting the red light and a dielectric multi-layer film for reflecting the blue light are formed along the boundaries of four right-angle prisms approximately in X-shape, the dielectric multi-layer films combining the three color lights. The above cross dichroic prism 444 is formed of an optical glass.

The projection lens 46 projects the color image combined by the cross dichroic prism 444 of the prism unit 44 in an enlarged manner.

(3) Structure of Cooling Unit

Figure 4:
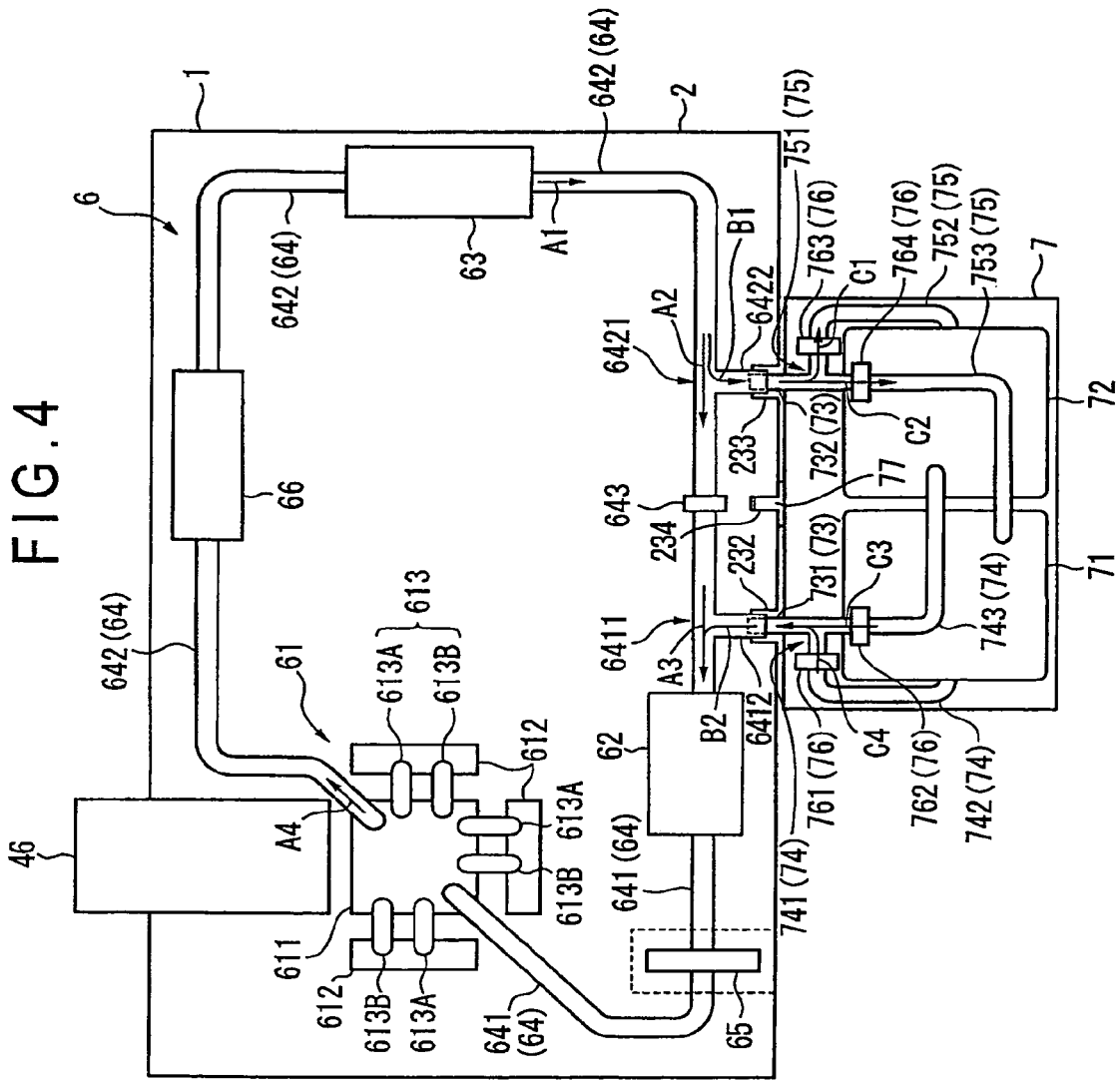
FIG. 4 is a schematic view showing a configuration of a cooling unit according to the exemplary embodiment.

FIG. 4 schematically shows the cooling unit 6 housed in the projector 1 and cooling medium replacement cartridge 7 to be connected to the cooling unit 6.

The cooling unit 6 is disposed in the exterior case 2 and is a cooling system that circulates a liquid cooling medium such as ethylene glycol solution to cool the components that need to be cooled in the projector 1.

The cooling unit 6 includes a chiller 61 for cooling the liquid crystal panels 441 and irradiation-side polarization plates 443 which are components provided in the optical unit 4 described above, a tank 62 serving as a cooling medium storage section that temporarily stores the cooling medium, a pump 63 serving as a medium circulator that circulates the cooling medium between the chiller 61 and tank 62, and a tube 64 that connects the chiller 61, tank 62, and pump 63 to form a cooling medium distribution path.

The tube 64 is constituted by a first tube 641 that guides the cooling medium from the tank 62 to the chiller 61 and a second tube 642 that sends the cooling medium that has been used in the chiller 61 back to the tank 62.

As described above, the chiller 61 is used for cooling down the heat generated in the liquid crystal panels 441 and irradiation-side polarization plates 443 with the cooling medium.

The chiller 61 includes a relay member 611 that is connected to the first tube 641 and relays the cooling medium delivered under pressure from the pump 63, cooling members 612 that cool the liquid crystal panels 441 and irradiation-side polarization plates 443 with the cooling medium delivered from the relay member 611, and a tube 613 that connects the relay member 611 and respective cooling members 612.

The tube 613 is constituted by forward path tubes 613A that deliver the cooling medium from the relay member 611 to respective cooling members 612 and backward path tubes 613B that send the cooling medium having been used in the cooling members 612 back to the relay member 611.

Although not illustrated in detail, the relay member 611 is a hollow member made of aluminum. The relay member 611 delivers the cooling medium sent from the tank 62 through the first tube 641 to the respective cooling members 612, as well as collects the cooling medium that has been used in the cooling members 612 and delivers it to the second tube 642. The relay member 611 is placed on the aforementioned cross dichroic prism 444.

The cooling members 612 contact with the liquid crystal panels 441 and irradiation-side polarization plates 443 (FIG. 3) which are disposed on the light beam incident-side of the cross dichroic prism 444, respectively such that a heat can be transferred between them. Further, the cooling members 612 cool the heat generated in the liquid crystal panels 441 and irradiation-side polarization plates 443 with the cooling medium delivered from the relay member 611.

The cooling medium delivered from the relay member 611 through the forward path tubes 613A is distributed in the cooling members 612. After cooling the liquid crystal panels 441 and irradiation-side polarization plates 443, the distributed cooling medium is delivered to the relay member 611 through the backward path tubes 613B.

Figure 5:
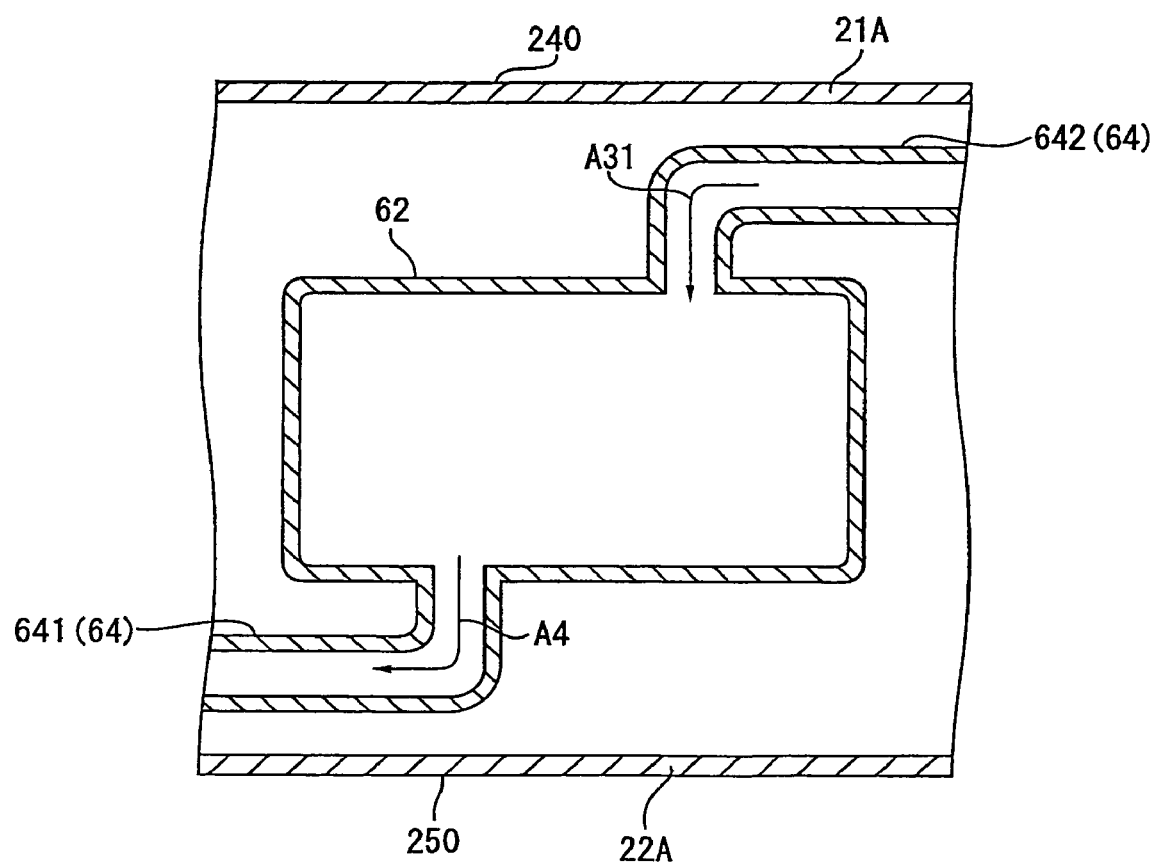
FIG. 5 is a vertical cross section of a tank according to the exemplary embodiment.

FIG. 5 is a vertical cross-section showing the tank 62.

The tank 62 temporarily stores a cooling medium. The tank 62 includes a full level detection sensor 621 (not shown in FIG. 5, see FIG. 7) serving as a full level detection section that detects whether the tank 62 is filled up with a cooling medium. The full level detection sensor 621 is connected to the controller 67 and a detection result of the sensor 621 is sent to the controller 67.

As shown in FIG. 5, the second tube 642 in which the cooling medium delivered under pressure from the pump 63 is distributed is connected to the upper surface of the tank 62. The first tube 641 that delivers the cooling medium in the tank 62 to the chiller 61 is connected to the bottom surface of the tank 62. With this configuration, the cooling medium delivered under pressure from the pump 63 through the second tube 642 flows in the tank 62 in the direction of an arrow A31 in FIG. 5 (i.e. from the upper side), and flows out in the direction of an arrow A4, that is, from the bottom of the tank 62 through the first tube 641.

By providing the above tank 62, more cooling medium than required to be distributed in the cooling unit 6 can be assured, and as a result a stable supply of the cooling medium for distribution in the cooling unit 6 can be maintained. Further, in the tank 62, heat of the cooling medium that has been used for cooling in the chiller 61 and thereby heated is radiated naturally, increasing cooling efficiency of the cooling unit 6.

The pump 63 delivers a cooling medium under pressure to the tube 64 and the drive thereof is controlled by the controller 67. Although not illustrated in detail, the pump 63 is, for example, a hollow member made of aluminum having substantially a rectangular parallelepiped shape in which a gear wheel is provided. The cooling medium in the tank 62 and tube 64 is forcibly circulated by the above pump 63.

The tube 64 is formed of an aluminum tubular member such that the cooling medium can be circulated inside thereof, and is constituted by, as described above, the first and second tubes 641 and 642. The tube 64 may be formed of metal such as stainless steel, synthetic resin, rubber pipe, or the like instead of aluminum. When the tube 64 employs a metal tubular member, the heat of the distributed cooling medium is radiated also during distribution in the tube 64, further increasing cooling efficiency of the cooling medium.

A filter 65 is disposed on a flow path of the first tube 641 that connects the chiller 61 and tank 62 to guide the cooling medium from the tank 62 to the chiller 61.

The filter 65 is a mesh filter for filtering and removing impurities in the distributed cooling medium. The filter 65 is replaceable and can be removed from an opening (not shown) formed on the exterior case 2.

In addition to the pump 63, a radiator 66 that cools the heated cooling medium is disposed on a flow path of the second tube 642 for connecting the chiller 61 and tank 62 to send the cooling medium that has been used in the chiller 61 back to the tank 62.

Although not illustrated in detail, the radiator 66 has a substantially S-shaped aluminum tubular member connected to the second tube 642, a radiation fin contacting with the tubular member such that a heat can be transferred between them, and a cooling fan fitted to the radiation fin. The heat of the cooling medium distributed in the tubular member is transferred to the radiation fin and then cooled by cooling air sent from the cooling fan. The cooling medium distributed in the cooling unit 6 can therefore be maintained at low temperature.

Two T-shaped tubes 6411 and 6421 are disposed on the second tube 642. The T-tube 6411 is disposed on the downstream side viewed in the cooling medium delivery direction from the pump 63 (i.e. the side close to the tank 62). The T-tube 6421 is disposed on the upstream side viewed in the cooling medium delivery direction (i.e. the side close to the pump 63).

Of three branch tubes extending from the T-tube 6411, two branch tubes are connected to the second tube 642 and the other one is connected to a tube joint 6412 that is exposed through the opening 232 formed on the aforementioned exterior case 2. The tube joint 6412 is a supply tube joint provided in order to supply a new cooling medium at the time of replacement of the cooling medium.

Likewise, of the three branch tubes extending from the T-tube 6421, two branch tubes are connected to the second tube 642 and the other one is connected to a tube joint 6422 that is exposed through the opening 233. The tube joint 6422 is a discharge tube joint provided in order to discharge the cooling medium distributed in the cooling unit 6 at the time of replacement of the cooling medium. A liquid level detection sensor 6422B (FIG. 7) serving as a liquid level detection section that detects the liquid level of the cooling medium distributed at the discharge tube joint 6422 is provided in the tube discharge joint 6422. The liquid level detection sensor 6422B is electrically connected to the controller 67 and a detection result of the liquid level detection sensor 6422B is thereby output to the controller 67.

A cooling medium replacement cartridge 7 is connected to the tube joint supply 6412 and discharge tube joint 6422. Lock mechanisms 6412A and 6422A (FIG. 7) for the cartridge 7 are provided in the supply tube joint 6412 and discharge tube joint 6422, respectively. Thus, the cartridge 7 cannot be removed from the projector 1 during the replacement of the cooling medium. The lock mechanisms 6412A and 6422A lock/unlock the cartridge 7 based on an electrical signal output from the controller 67.

Each of the supply tube joint 6412 and discharge tube joint 6422 includes a coupler or the like so as to allow the cooling medium to be distributed only when the cartridge 7 is connected to the projector 1.

A valve 643 serving as a flow path switch section that switches the distribution path of the cooling medium in the second tube 642 is disposed between the T-tubes 6411 and 6421 on the second tube 642. The valve 643 is connected to the controller 67. The open/close of the valve 643 is controlled by the controller 67, thereby switching the cooling medium flow path in the second tube 642.

In the cooling unit 6 having the above configuration, the cooling medium is circulated as follows.

In a normal state, the cooling medium delivered under pressure from the pump 63 to the second tube 642 flows in the direction indicated by an arrow A1 in FIG. 4 and reaches the T-tube 6421. When the cartridge 7 is not connected, the discharge tube joint 6422 and supply tube joint 6412 are in a closed state and the valve 643 is in an open state. Accordingly, the cooling medium flows in the direction indicated by arrows A2 and A3, to the tank 62.

The cooling medium distributed to the tank 62 flows in the tank 62 from the upper portion thereof as indicated by an arrow A31 in FIG. 5, then flows out from the bottom of the tank 62 in the direction indicated by an arrow A4 in FIGS. 4 and 5, and reaches the chiller 61 through the first tube 641.

The cooling medium that has reached the chiller 61 is then passed through the relay member 611 and forward path tubes 613A and reaches the cooling members 612, where the cooling medium cools the liquid crystal panels 441 and irradiation-side polarization plates 443. Then, the cooling medium flows in the relay member 611 through the backward path tubes 613B and is then distributed in the second tube 642 in the direction indicated by an arrow A5. The cooling medium is then cooled by the radiator 66 and returns to the pump 63.

As described above, the cooling unit 6 circulates the cooling medium to cool the liquid crystal panels 441 and irradiation-side polarization plates 443 by means of the chiller 61 provided in the circulation path.

Figure 6:
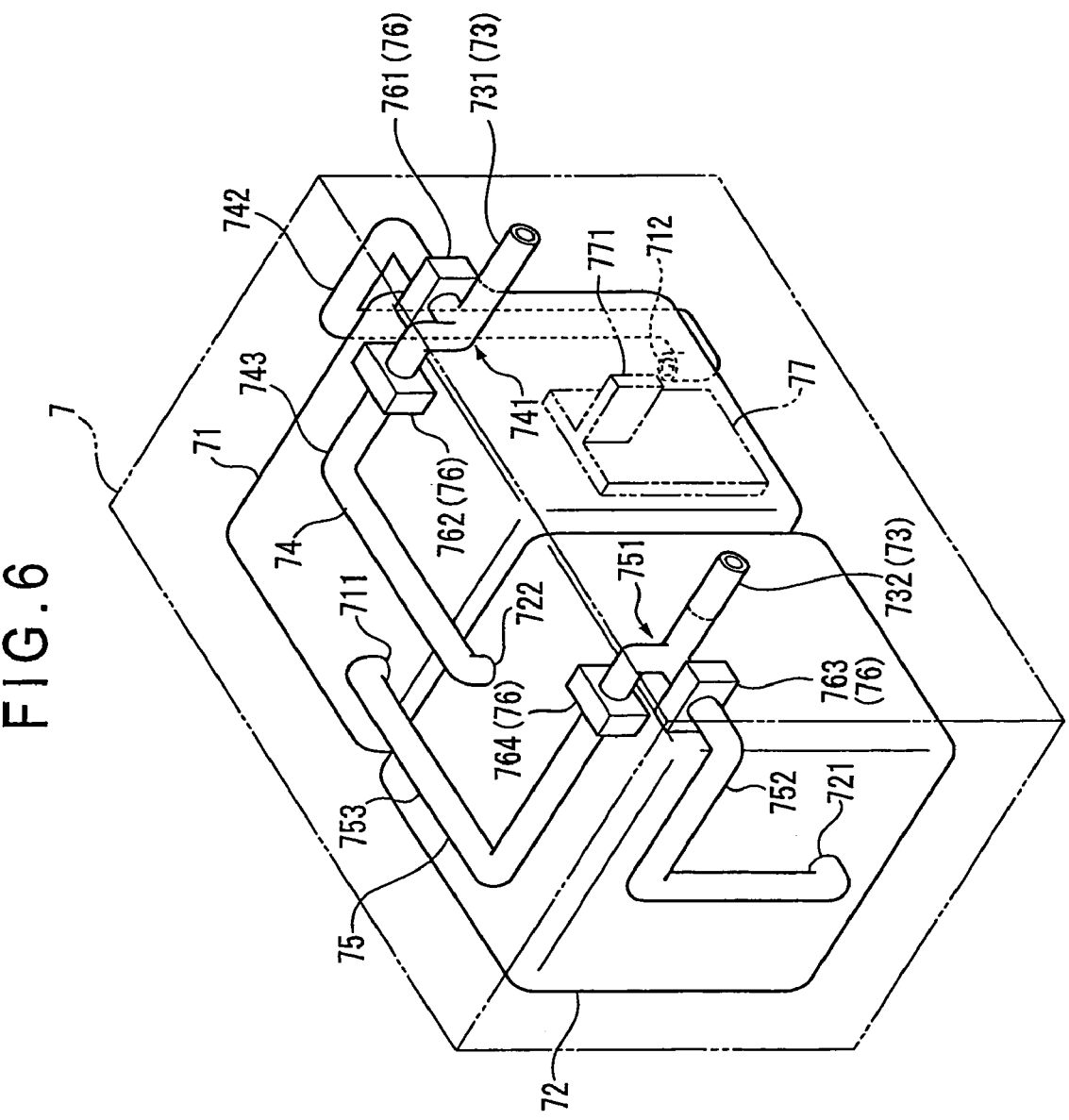
FIG. 6 is a perspective view showing a cooling medium replacement cartridge according to the exemplary embodiment.
Figure 7:
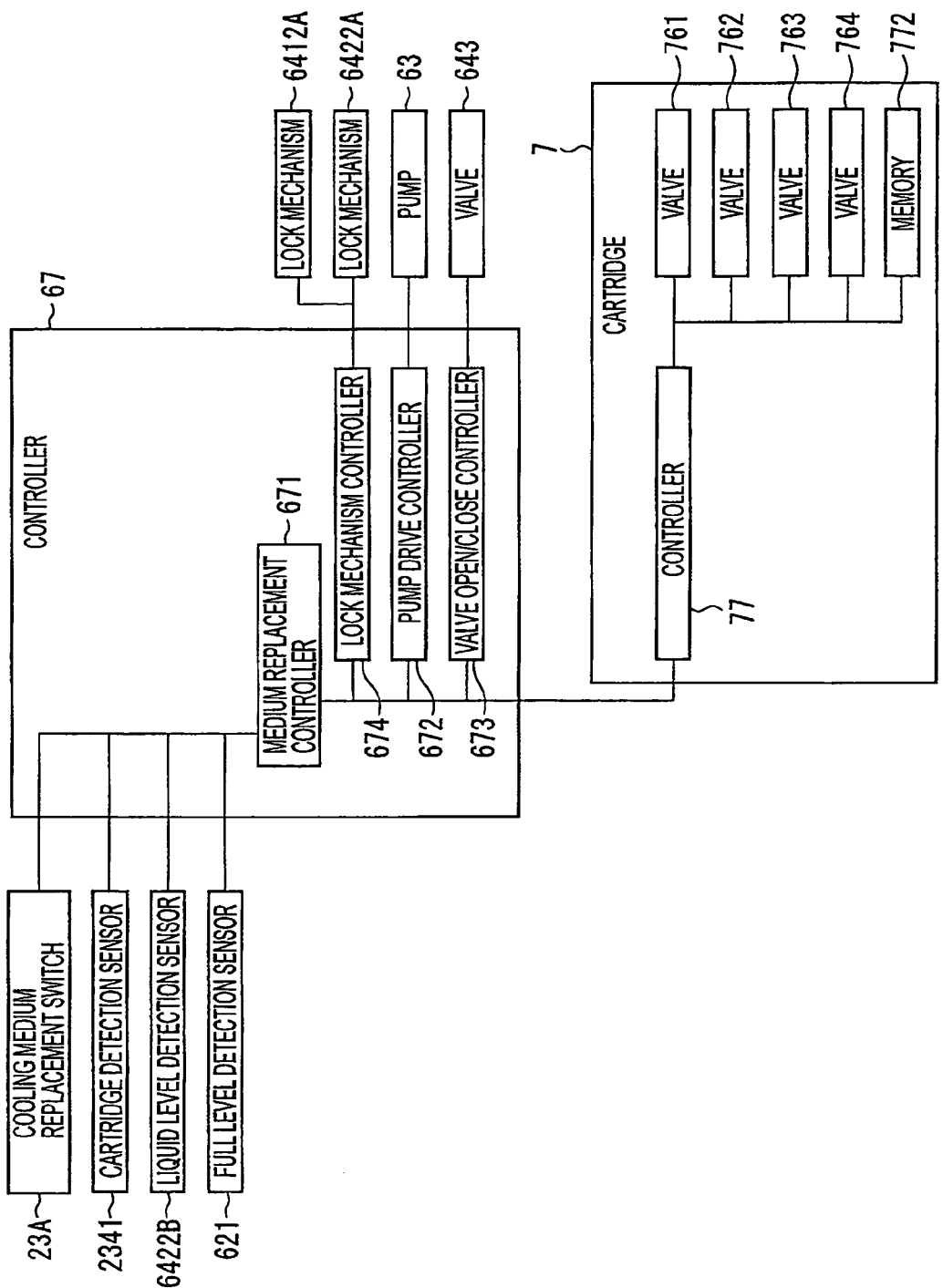
FIG. 7 is a block diagram showing a configuration of a controller according to the exemplary embodiment.

FIG. 6 is a perspective view of the cooling medium replacement cartridge 7 to be connected to the supply tube joint 6412 and discharge tube joint 6422 through the openings 232 and 233.

The cartridge 7 is used to replace the used cooling medium with a new one, and the cooling medium distributed in the cooling unit 6 is discharged through the discharge tube joint 6422 and a new cooling medium is supplied through the supply tube joint 6412.

As shown in FIGS. 4 and 6, the cartridge 7 includes two tanks 71 and 72, connecting sections 73 protruding from the cartridge 7, tubes 74 and 75 that connect the respective connecting sections 73 to the tanks 71 and 72, a switch section 76 that switches the flow path between the tubes 74 and 75, and a controller 77 that controls the switch section 76 to switch the flow path.

Each of the tanks 71 and 72 housed in the cartridge 7 is substantially a rectangular parallelepiped hollow member made of synthetic resin. The tank 71 serves as a second storage section for storing a new cooling medium to be supplied to the cooling unit 6 in the projector 1 at the replacement time. The tank 72 serves as a first storage section into which the cooling medium distributed in the cooling unit 6 is discharged.

Two openings are formed on the supply tank 71. More specifically, an opening 712 is formed on the bottom surface of the supply tank 71, and an opening 711 is formed on the upper surface of the supply tank 71.

Likewise, two openings are formed on the discharge tank 72. More specifically, an opening 721 is formed at the lower portion of the discharge tank 72 on the surface opposite to the surface that faces a side surface of the supply tank 71 and an opening 722 is formed on the upper surface of the discharge tank 72.

The connecting sections 73 are exposed to the outside of the cartridge 7, which includes a first connecting section 731 to be connected to the aforementioned supply tube joint 6412 and a second connecting section 732 to be connected to the discharge tube joint 6422.

The tube 74 is an aluminum tubular member that connects the first connecting section 731 to the supply and discharge tanks 71 and 72, respectively. The tube 74 is constituted by a T-tube 741, a first supply tube 742, and a second supply tube 743.

Of the three branch tubes extending from the T-tube 741, a first one is connected to the first connecting section 731, a second one is connected to the first supply tube 742, and a third one is connected to the second supply tube 743, respectively. One end of the first supply tube 742 is connected to the T-tube 741, and the other end thereof is connected to the opening 712 formed on the bottom surface of the supply tank 71. One end of the second supply tube 743 is connected to the T-tube 741 and the other end thereof is connected to the opening 722 of the discharge tank 72.

The tube 75 has the same configuration as that of the tube 74 and connects the second connecting section 732 to the supply and discharge tanks 71 and 72, respectively.

That is, the tube 75 is constituted by a T-tube 751, a first discharge tube 752, and a second discharge tube 753. Of the three branch tubes extending from the T-tube 751, a first one is connected to the second connecting section 732, a second one is connected to the first discharge tube 752 that is connected to the opening 721 of the discharge tank 72, and a third one is connected to the second discharge tube 753 that is connected to the opening 711 of the supply tank 71.

Each of the tubes 74 and 75 may be formed of metal other than aluminum synthetic resin, rubber, or the like.

The switch section 76 switches the flow path between the tubes 74 and 75 as described above, and is constituted by valves 761 and 762 which are provided for the tube 74 and valves 763 and 764 which are provided for the tube 75. The valve 761 is disposed on the first supply tube 742 of the tube 74, and the valve 762 is disposed on the second supply tube 743. The valve 763 is disposed on the first discharge tube 752 of the tube 75, and the valve 764 is disposed on the second discharge tube 753.

The switch section 76 is electrically connected to the controller 77 and the switching of open/close of the valves 761 to 764 is controlled based on an electrical signal from the controller 77.

The controller 77 is electrically connected to the controller 67 (FIG. 7) that controls the cooling unit 6 of the projector 1. By receiving a valve open/close signal output from the controller 67, the controller 77 controls the switching of open/close of the valves 761 to 764 of the switch section 76. A memory 772 (FIG. 7) is implemented in the controller 77. At the cooling medium replacement time, data is read/written from or into the memory 772. That is, when the cartridge 7 is unused one, the memory 772 holds data that the cartridge is unused. After the replacement of the cooling medium has been completed, the data of the memory 772 is updated by data indicating that the cartridge is used one. In addition, the memory 772 may be constructed by a switch or the like that can make a distinction between used state and unused state.

The controller 77 includes a terminal 771 exposed to the outside of the cartridge 7 and connected to the controller 67. The terminal 771 is inserted into the opening 234 formed on the exterior case 2 of the projector 1 and connected to a connector (not shown) disposed in the opening 234. The connector is connected to the controller 67. As a result, the controllers 67 and 77 are connected to each other through the connector and terminal 771.

As described above, the supply and discharge tanks 71 and 72 are provided in one cartridge 7. Further, the flow path for a new cooling medium that is supplied from the supply tank 71 and the flow path for the cooling medium discharged into the discharge tank 72 are connected to the different connecting sections 731 and 732, respectively. With this configuration, the flow path is not occupied by one of the processes of supply and discharge, realizing a smooth distribution of the cooling medium.

Further, since the supply and discharge tanks 71 and 72 are provided in one cartridge 7 as described above, replacement of the cooling medium can be performed simply by connecting the cartridge 7 to the projector 1. Therefore, the cooling medium can be easily replaced with a new one.

FIG. 7 is a block diagram showing a configuration of the controller 67 that controls the operation at the time of replacement of the cooling medium.

The controller 67 serving as a controller for controlling the cooling operation of the cooling unit 6 is provided on a control board (not shown) that controls the operation of the projector 1.

The controller 67 includes a medium replacement controller 671, a pump drive controller 672, a valve open/close controller 673, and a lock mechanism controller 674. The controller 67 is connected to the controller 77 through a connector (not shown) disposed in the opening 234 and the terminal 771 disposed in the cartridge 7.

The medium replacement controller 671 is connected to the aforementioned cooling medium replacement switch 23A, cartridge detection sensor 2341, liquid level detection sensor 6422B, and full level detection sensor 621. The medium replacement controller 671 receives electrical signals output from the switch 23A and sensors 2341, 6422B, 621 and, at the time of replacement of the cooling medium, outputs a drive signal of the pump 63, an open/close signal of the valve 643, lock/unlock signals of the lock mechanism 6412A and 6422A, and open/close signals of the valves 761 to 764 of the cartridge 7 to the pump drive controller 672, valve open/close controller 673, lock mechanism controller 674, and aforementioned controller 77 of the cartridge 7, respectively.

The pump drive controller 672 controls drive of the pump 63 based on the pump drive signal from the medium replacement controller 671.

The valve open/close controller 673 controls open/close operation of the valve 643 based on the valve open/close signal from the medium replacement controller 671 to switch the flow path of the cooling medium in the second tube 642.

The lock mechanism controller 674 controls the lock mechanisms 6412A and 6422A to perform lock/unlock switching operation based on the lock/unlock signal from the medium replacement controller 671.

(4) Replacement Process of Cooling Medium

Figure 8:
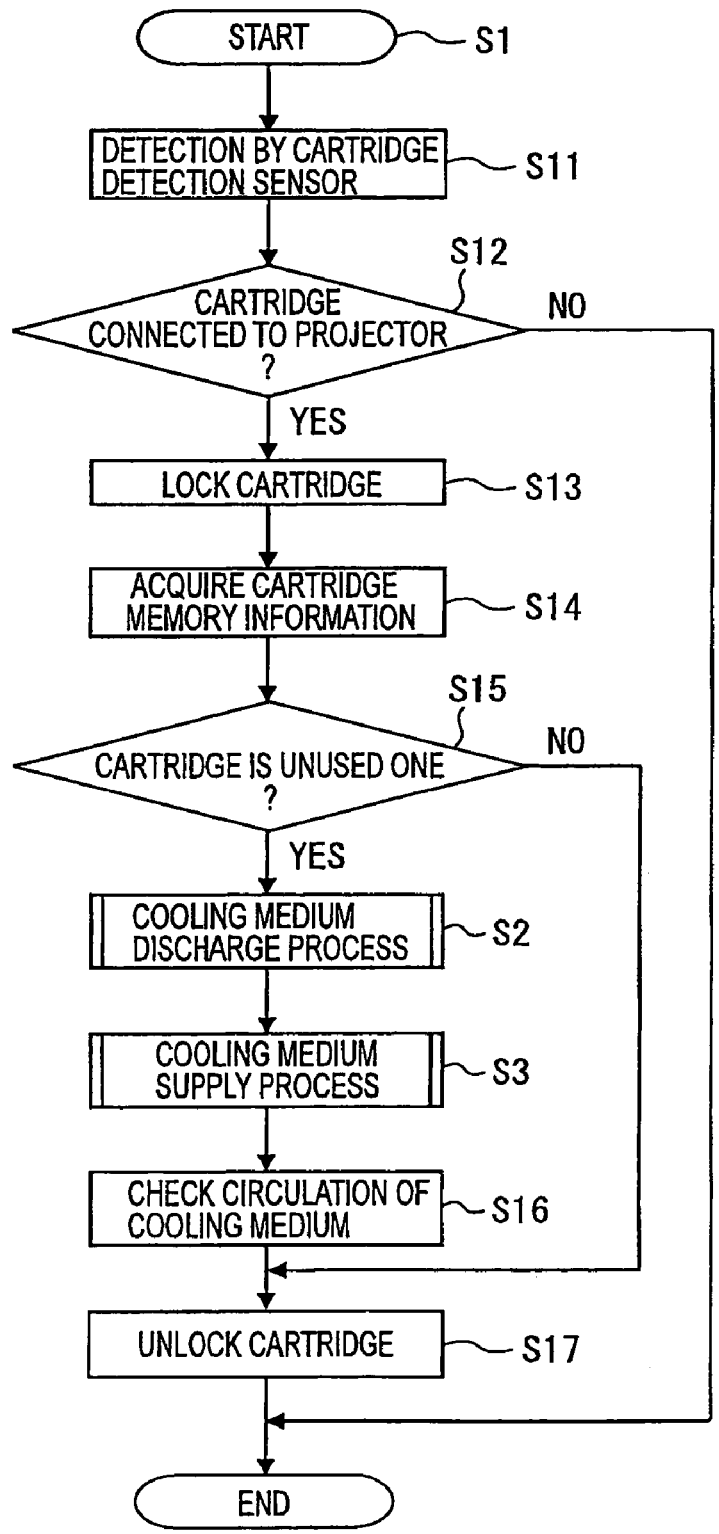
FIG. 8 is a flowchart showing a procedure for replacing the cooling medium according to the exemplary embodiment.
Figure 9:
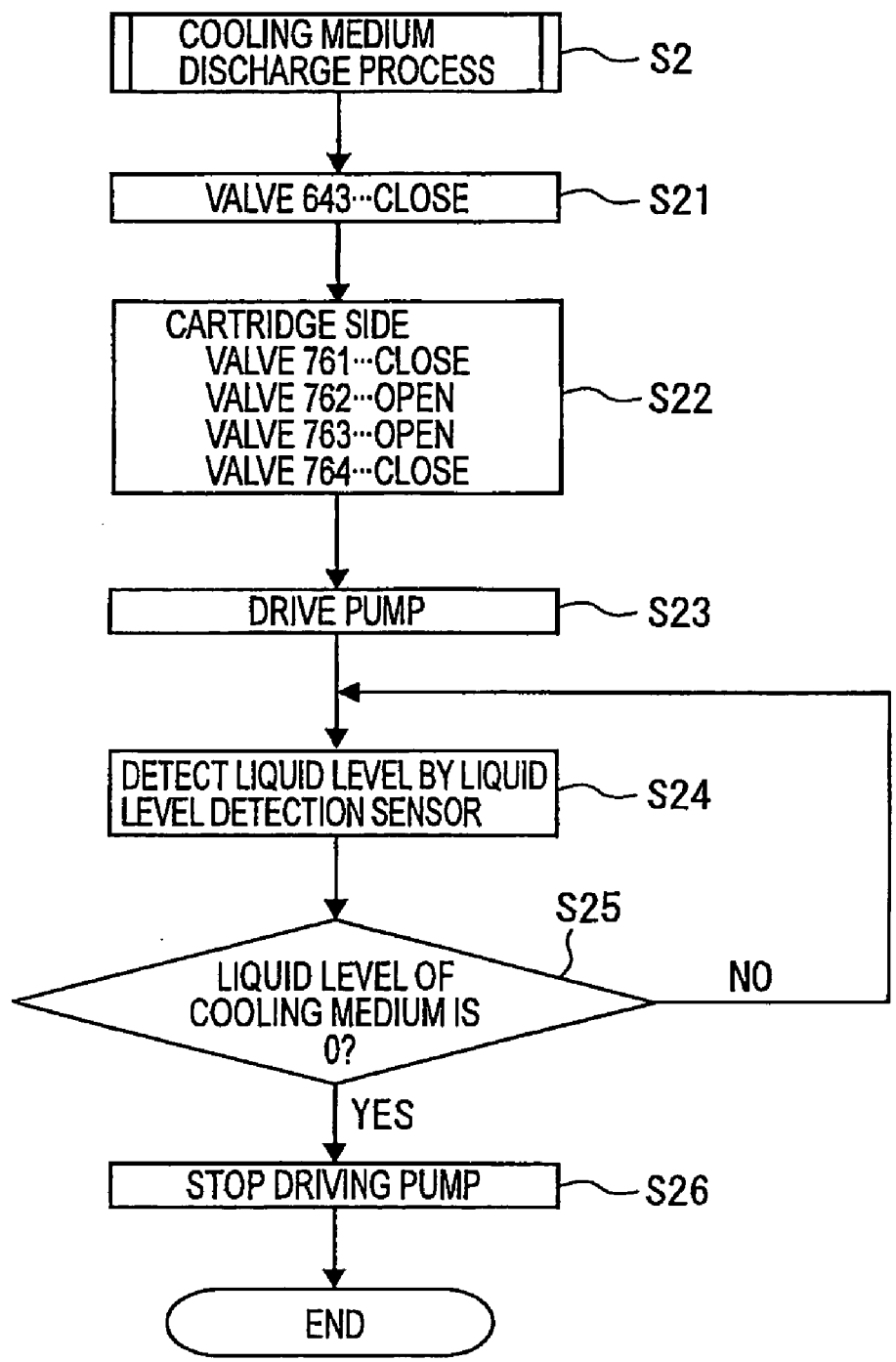
FIG. 9 is a flowchart showing a procedure for discharging the cooling medium according to the exemplary embodiment.
Figure 10:
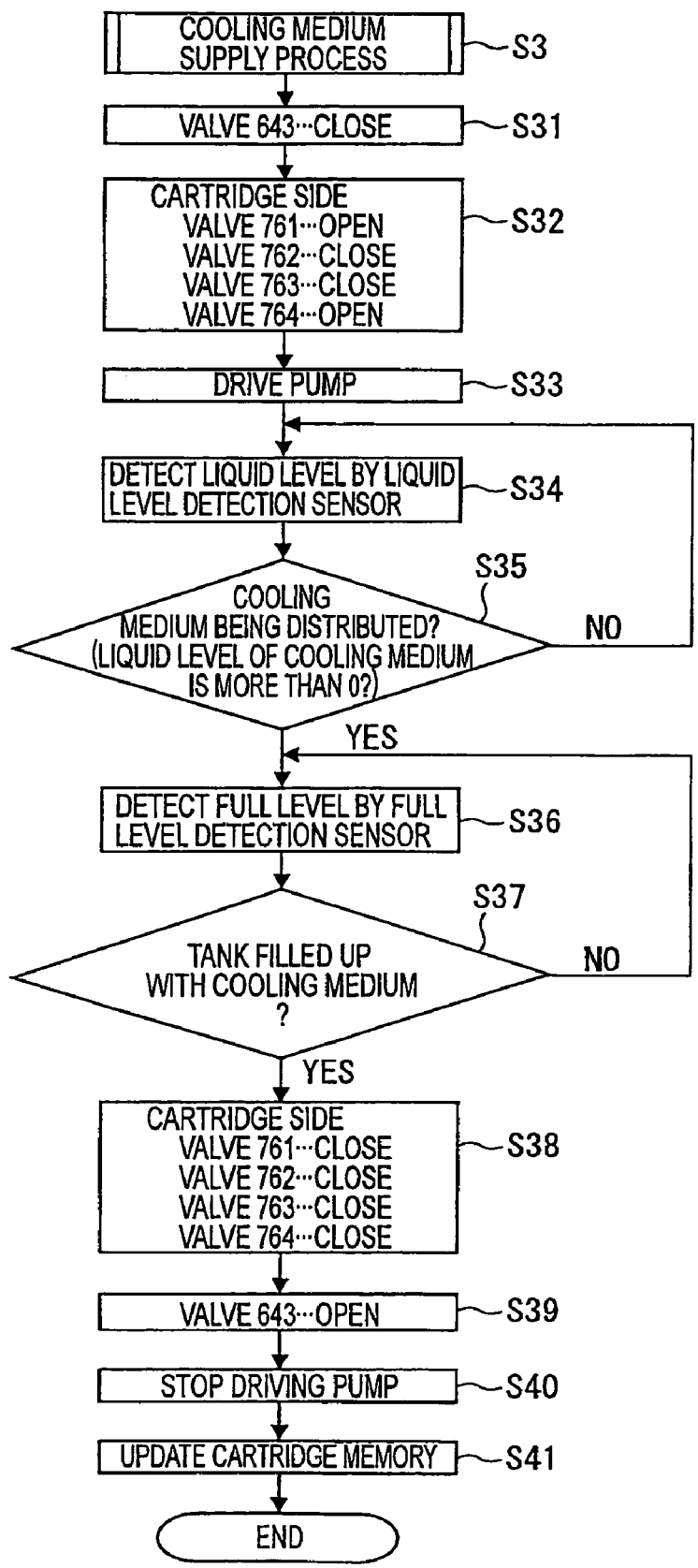
FIG. 10 is a flowchart showing a procedure for supplying the cooling medium according to the exemplary embodiment.

FIG. 8 is a flowchart showing a procedure for replacing a cooling medium. FIG. 9 is a flowchart showing a procedure for discharging a cooling medium at the time of replacement of a cooling medium, and FIG. 10 is a flowchart showing a procedure for supplying a cooling medium at the time of replacement of the cooling medium.

Procedures for replacement of the cooling medium of the cooling unit 6 and the cooling medium replacement cartridge 7 will be described with reference to the flowcharts shown in FIGS. 8 to 10.

The cooling medium replacement process is started when an electrical signal caused by the input of the aforementioned cooling medium replacement switch 23A is input to the medium replacement controller 671. At this time, a message indicating that replacement of the cooling medium is being performed may be displayed or voice indicating the same may be output through a not-shown speaker.

In the cooling medium replacement process (process S1), as shown in FIG. 8, firstly, the cartridge detection sensor 2341 detects the cartridge 7 (process S11). Thereafter, the medium replacement controller 671 determines the detection result of the cartridge detection sensor 2341 (process S12). When determining that the cartridge 7 has not been attached, the medium replacement controller 671 stops the cooling medium replacement process. At this time, a message indicating that the cartridge 7 has not been attached may be displayed as a projection image or output as voice.

When it has been determined that cartridge 7 is attached, the cartridge 7 is locked (process S13) so as to prevent the cartridge 7 from dropping or being removed by a user during the replacement of a cooling medium and to prevent a cooling medium from being leaked from the discharge tube joint 6422. In this process, the lock mechanism controller 674 activates the lock mechanisms 6412A and 6422A based on a lock signal output from the medium replacement controller 671 to lock the cartridge 7.

Next, acquisition of the data (information) recorded on the memory 772 of the controller 77 in the cartridge 7 is performed (process S14). The controller 77 acquires the data on the memory 772 and outputs the data to the medium replacement controller 671 through the terminal 771. The medium replacement controller 671 determines the output data (process S15). In this process, it is determined whether the connected cartridge 7 is used one or unused one. When the cartridge 7 is determined to be a used one, the cartridge 7 is unlocked (process S17) and the cooling medium replacement process is ended. At this time, a message indicating that the cartridge 7 is used one may be output as an image and/or voice. When the cartridge 7 is determined to be an unused one, a cooling medium discharge process for discharging the cooling medium (process S2) is started.

In the cooling medium discharge process (process S2), as shown in FIG. 9, firstly, switching control (process S21) of the valve 643 in the cooling unit 6 is performed. In this process, the valve open/close controller 673 closes the valve 643 based on the open/close signal from the medium replacement controller 671.

Next, switching control (process S22) of the valves 761 to 764 in the cartridge 7 is performed. In this process, the controller 77 of the cartridge 7 closes the valves 761 and 764 and opens the valves 762 and 763 of all the closed valves 761 to 764 based on an electrical signal output from the medium replacement controller 671. In this state, the pump 63 is actuated through the pump drive controller 672 (process S23).

When the valve 643 is closed as shown in FIG. 4, the cooling medium distributed at the T-tube 6421 flows in the direction indicated by an arrow B1. At the same time, the cooling medium distributed at the T-tube 751 of the tube 75 in the cartridge 7 flows in the direction indicated by an arrow C1. As a result, the cooling medium distributed in the cooling unit 6 is discharged into the discharge tank 72 through the discharge tube joint 6422. Further, the cooling medium distributed at the T-tube 741 of the tube 74 in the cartridge 7 flows in the direction indicated by an arrow C3, and the cooling medium distributed at the T-tube 6411 of the second tube 642 flows in the direction indicated by an arrow B2. As a result, air stored in the discharge tank 72 is supplied to the second tube 642 through the supply tube joint 6412.

The cooling medium is discharged through the opening 721 formed at the lower portion of the discharge tank 72 and the air sealed in the discharge tank 72 is supplied to the supply tube joint 6412 through the opening 722 formed on the upper surface of the discharge tank 72. This prevents the cooling medium that has been discharged into the discharge tank 72 from flowing in the second tube 642 through the supply tube joint 6412.

As a result, it is possible to discharge the cooling medium in the cooling unit 6 as well as to supply the cooling unit 6 with air in place of the cooling medium, preventing the pressure within the respective members of the cooling unit 6 from being reduced to prevent breakage or damage on account of the pressure reduction.

Next, as shown in FIG. 9, the liquid level detection sensor 6422B provided in the discharge tube joint 6422 detects the liquid level of the cooling medium distributed at the discharge tube joint 6422 (process S24). The detection result is output to the medium replacement controller 671, where the liquid level of the cooling medium is determined (Process S25). When the liquid level of the cooling medium distributed at the discharge tube joint 6422 is not 0, the medium replacement controller 671 determines that the discharge of the cooling medium continues and repeats the processes S24 and S25. When the liquid level of the cooling medium distributed at the discharge tube joint 6422 is 0, the medium replacement controller 671 determines that the discharge of the cooling medium has been completed and allows the pump drive controller 672 to stop the drive of the pump 63 (process S26). The connecting section between the tank 62 and first tube 641 is formed on the bottom surface of the tank 62. Thus, the liquid level of the cooling medium at the discharge tube joint 6422 does not become 0 until substantially all cooling medium in the tank 62 has been discharged. That is, when the liquid level of the cooling medium at the discharge tube joint 6422 is 0, it can be determined that the discharge of substantially all cooling medium in the cooling unit 6 has been completed. Completion of the discharge of the cooling medium can thus be detected, so that the cooling medium can be discharged reliably and thereby the next process of supplying a new cooling medium can be performed.

After the discharge of the cooling medium has been completed, a cooling medium supply process (process S3) is performed to supply the cooling unit 6 with a new cooling medium from the cartridge 7, as shown in FIG. 8.

In the cooling medium supply process (process S3), as shown in FIG. 10, firstly, the medium replacement controller 671 instructs the valve open/close controller 673 to close the valve 643 disposed on the second tube 642 (process S31). In a normal state, the valve 643 has been closed by the aforementioned process S21 at the time of replacement of the cooling medium without performing the process S31.

Thereafter, the medium replacement controller 671 instructs the controller 77 of the cartridge 7 to open the valves 761 and 764 and close the valves 762 and 763 (process S32). In this state, the medium replacement controller 671 drives the pump 63 (process S33) through the pump drive controller 672.

In this case, as shown in FIG. 4, the cooling medium distributed at the T-tube 741 of the tube 74 in the cartridge 7 flows in the direction indicated by an arrow C4. At the same time, the cooling medium distributed at the T-tube 6411 of the second tube 642 flows in the direction indicated by an arrow B2. As a result, a new cooling medium in the supply tank 71 is distributed in the direction indicated by the arrows C4 and B2 in FIG. 4 and arrow A31 in FIG. 5 and flows in the tank 62. Further, as shown in FIG. 4, since the valve 643 is closed and valve 764 of the cartridge 7 is opened, the new cooling medium or aforementioned air of the discharge tank 72 that has been supplied in the cooling medium discharge process (process S2) flows in the direction indicated by the arrows B1 and C2 at the T-tube 6421 of the second tube 642 and returns to the supply tank 71.

Since the new cooling medium is supplied from the opening 712 formed on the bottom surface of the supply tank 71, substantially all new cooling medium that has been stored in the supply tank 71 can be used. At the same time, the air distributed in the cooling unit 6 as a substitute for the cooling medium flows in the supply tank 71 through the opening 711 formed on the upper surface of the supply tank 71. As a result, a new cooling medium can reliably be supplied to the cooling unit 6 from the supply tank 71.

Therefore, the pressure increase within the members constituting the cooling unit 6 can be prevented at the time of supply of the new cooling medium, thereby preventing breakage or damage of the members as in the case of the time of discharge of the cooling medium described above.

Next, as shown in FIG. 10, the liquid level detection sensor 6422B detects the liquid level of the cooling medium distributed at the discharge tube joint 6422 (process S34). The detection result is output to the medium replacement controller 671. The medium replacement controller 671 determines the liquid level of the cooling medium based on the detection result and then determines whether the cooling medium is being distributed or not (process S35). When the distribution of the cooling medium is not detected at the discharge tube joint 6422, that is, the liquid level of the cooling medium is 0, the medium replacement controller 671 determines that the tube 64 has not been filled up with the new cooling medium and repeats the processes S34 and S35 in order to continue the supply of the new cooling medium. When the distribution of the cooling medium is detected, that is, the liquid level of the cooling medium is more than 0, the medium replacement controller 671 determines that the new cooling medium supplied from the supply tube joint 6412 has reached the discharge tube joint 6422 of the second tube 642 and shifts to the next process.

Next, the full level detection sensor 621 provided in the tank 62 detects whether the liquid level of the cooling medium in the tank 62 has reached a full level (process S36). The detection result is output to the medium replacement controller 671, where it is determined that the tank 62 has been filled up with the new cooling medium (process S37). When the tank 62 has not been filled up with the new cooling medium, the medium replacement controller 671 determines that the supply of the new cooling medium has not been completed and repeats the processes S36 and S37. When the full level of the tank 62 has been detected, the medium replacement controller 671 instructs the controller 77 to close all the valves 761 to 764 of the cartridge 7 (process S38), instructs the valve open/close controller 673 to open the valve 643 in the cooling unit 6 (process S39), and stop the drive of the pump 63 (process S40). After that, the medium replacement controller 671 updates the data in the memory 772 provided in the controller 77 of the cartridge 7 with data (information) indicating that the cartridge 7 is a used one (process S41).

The processes S34, S35 and S36, S37 may be performed in reverse order. In other words, the processes S36, S37 may be performed first, followed by the processes S34, S35.

As described above, the liquid level detection sensor 6422B detects the distribution of the new cooling medium at the discharge tube joint 6422, and the full level detection sensor 621 detects that the tank 62 has been filled up with the new cooling medium. Therefore, it is possible to confirm that the cooling medium in the cooling unit 6 has been replaced with the new cooling medium and thereby to quickly end the cooling medium supply process. Further, by updating the data in the memory 772 with data (information) indicating that the cartridge 7 is a used one, it is possible to prevent replacement process from being performed in the case where the used cartridge 7 is attached and to notify a user that the attached cartridge 7 is used one.

After the cooling medium supply process (process S3) has been completed, the medium replacement controller 671 drives again the pump 63 to check if the cooling medium in the cooling unit 6 circulated normally (process S16). If something is wrong with the circulation of the cooling medium, a message indicating accordingly may be output as an image and/or voice. After that, the medium replacement controller 671 instructs the lock mechanism controller 674 to unlock the lock mechanisms 6412A and 6422A to allow detachment of the cartridge 7 (process S17).

This is the end of the cooling medium replacement process.

The above cooling medium replacement process can automatically be performed under the control of the medium replacement controller 671 after the user has attached the cartridge 7 and operated the cooling medium replacement switch 23A. That is, the medium replacement controller 671 controls the pump 63, valve 643, lock mechanisms 6412A and 6422A, and valves 761 to 764 in the cartridge 7 respectively through the pump drive controller 672, valve open/close controller 673, lock mechanism controller 674, and controller 77 in the cartridge 7, so that the cooling medium circulated in the cooling unit 6 can be replaced with the new cooling medium in the cooling medium replacement cartridge 7. Therefore, the replacement of the cooling medium can easily be performed without the need for the user to perform any special operations.

[Modification of Exemplary Embodiment]

The present invention is not limited to the above-described exemplary embodiment, and may be modified and altered within a range to achieve the object thereof.

For example, the supply tube joint 6412 for supplying a new cooling medium and discharge tube joint 6422 for discharging a distributed cooling medium are individually provided in the above exemplary embodiment. Alternatively, however, one tube joint may be used to perform discharge and supply of the cooling medium. In this case, by providing an opening that allows passage of air but blocks passage of the cooling medium in the tube 64, the pressure within the cooling unit 6 can be prevented from being decreased or increased at the time of replacement of the cooling medium. Incidentally, when the supply tube joint 6412 and discharge tube joint 6422 are individually provided in the cooling unit 6 to allow the air sealed in the discharge tank 72 of the cartridge 7 to be distributed in the cooling unit 6 at the cooling medium discharge time and to allow the distributed air to be distributed in the supply tank 71 at the time of the supply of a new cooling medium, it is possible to reliably prevent the cooling unit 6 from being broken or damaged due to increase or decrease in the pressure. Further, it is possible not only to reduce a possibility of leakage of the cooling medium, but also to prevent introduction of air after the cooling medium replacement process.

The supply tube joint 6412 and discharge tube joint 6422 are disposed on the second tube 642 in the above exemplary embodiment. Alternatively, however, the present invention is not limited thereto, and the supply tube joint 6412 and discharge tube joint 6422 may be disposed on the first tube 641. Further, one of the supply tube joint 6412 and discharge tube joint 6422 may be disposed on the first tube 641, and the other may be disposed on the second tube 642. That is, positions of the supply tube joint 6412 and discharge tube joint 6422 are no object.

The discharge tube joint 6422 is disposed on the upstream of the cooling medium delivery direction from the pump 63 and the supply tube joint 6412 is disposed on the downstream in the above exemplary embodiment. Alternatively, however, positions of the tube joints 6412 and 6422 may be reversed. That is, the supply tube joint 6412 may be disposed on the upstream and the discharge tube joint 6422 may be disposed on the downstream. Incidentally, when the discharge tube joint 6422 is disposed on the upstream and the supply tube joint 6412 is disposed on the downstream as in the case of the above exemplary embodiment, the flow path for discharging the cooling medium and that for the air to be distributed as a substitute for the cooling medium are not overlapped with each other at the time of discharge of the cooling medium. Further, the flow path for the air and that for the new cooling medium to be supplied are not overlapped with each other at the time of the supply of the cooling medium. As a result, the replacement of the cooling medium can smoothly be performed.

The new cooling medium is supplied to the cooling unit 6 after the cooling medium has been discharged in the above exemplary embodiment. Alternatively, however, the discharge and supply processes may be performed at the same time. Incidentally, when the procedure in which the new cooling medium is supplied to the cooling unit 6 after the cooling medium circulated in the cooling unit 6 has been discharged is employed, the used cooling medium can reliably be replaced with the new cooling medium.

The supply of the new cooling medium is stopped immediately after the liquid level detection sensor 6422B has detected that the new cooling medium has reached the discharge tube joint 6422 and the full level detection sensor has detected that the tank 62 has been filled up with the new cooling medium in the above exemplary embodiment. Alternatively, however, the supply of the new cooling medium may be stopped after an interval from the detections. The new cooling medium may be discharged into the discharge tank 72 for a short while from the start of the supply of the new cooling medium. In this case, the cooling unit 6 is cleaned with the new cooling medium. As a result, the used cooling medium can reliably be replaced with the new cooling medium.

The chiller 61 cools the liquid crystal panels 441 and irradiation-side polarization plates 443 in the above exemplary embodiment. Alternatively, however, the chiller 61 may cool other members including other optical components constituting the optical unit 4 such as the light source 411, control board and power supply unit.

While the components in the cooling unit 6 are disposed in the order of the tank 62, filter 65, chiller 61, and radiator 66 viewed in the delivery direction of the pump 63 in the above exemplary embodiment, the present invention is not limited to the above configuration. For example, the positions of the pump 63 and tank 62 may be reversed.

The cooling medium replacement process is started when the cooling medium replacement switch 23A is operated in the above exemplary embodiment. Alternatively, however, the cooling medium replacement process may be started when the cartridge detection sensor 2341 has detected the attachment of the cooling medium replacement cartridge 7. Alternatively, the cooling medium replacement process may be started by selecting a start menu or the like displayed in a menu window projected for setting of the projector 1, without providing the cooling medium replacement switch 23A.

While the projector includes three liquid crystal panels 441 in the above exemplary embodiment, the present invention is applicable to the projector including four or more liquid crystal panels.

While the liquid crystal panel 441 is used as an optical modulator in the above exemplary embodiment, the optical modulator other than the liquid crystal panel, such as a device using a micromirror may be used.

The transmissive liquid crystal panel in which a light incident surface and light irradiation surface are separately provided is used in the above exemplary embodiment. Alternatively, however, a reflective liquid crystal panel in which a light incident surface and light irradiation surface are the same may be used.

Further, the front type projector that projects an image in a direction for observing a screen is used in the above exemplary embodiment. Alternatively, however, a rear-type projector that projects an image in a direction opposite to the direction for observing the screen may be used in the present invention.

While the projector 1 including the cooling unit 6 is taken as an example of the electronic apparatus in the above exemplary embodiment, the present invention is applicable to other electronic apparatus, especially, to an electronic apparatus using a semiconductor. For example, the present invention is applicable to a cooling system for a CPU of a personal computer. Incidentally, when the present invention is applied to the liquid cooling system of the projector as in the case of the above exemplary embodiment, degradation of a projection image due to influence of degradation of the cooling medium can be eliminated by the replacement of the cooling medium even in the case where the cooling medium is distributed in the light beam transmission area of the optical modulator such as a liquid crystal panel.

The priority application Number JP2004-110399 upon which this patent application is based is hereby incorporated by reference.

What is claimed is:

1. An electronic apparatus including an apparatus main body and a casing for housing the main body, and further including, inside of the apparatus, a cooling unit that circulates a liquid cooling medium to cool components constituting the main body, comprising:

a cooling medium storage section that is provided inside of the casing and stores the cooling medium;

a first tube system that guides the cooling medium from the cooling medium storage section to the components to be cooled;

a second tube system that sends back the cooling medium having been used for cooling the components to be cooled to the cooling medium storage section; and a medium circulator that is disposed on the first or second tube system in order to circulate the cooling medium through the cooling medium storage section, first tube system, and second tube system, wherein tube joints that are exposed to the outside of the casing, to which a cooling medium replacement cartridge used for replacing the cooling medium in the cooling medium storage section with a new cooling medium is connected, are provided in the first and/or second tube systems.

2. The electronic apparatus according to claim 1, wherein the tube joints are disposed on the first or second tube system, and one of the tube joints serves as a discharge tube joint for discharging the cooling medium in the cooling medium storage section and the other serves as a supply tube joint for supplying the cooling medium storage section with a new cooling medium from the cooling medium replacement cartridge.

3. The electronic apparatus according to claim 2, wherein the discharge tube joint is disposed on the upstream of a flow path relative to the supply tube joint.

4. The electronic apparatus according to claim 3, comprising:

a flow path switch section that switches flow paths between a flow path directed to the cooling medium storage section and a flow path directed to the discharge tube joint disposed between the supply tube joint and discharge tube joint on the second tube system;

a liquid level detection section that detects the liquid level of the cooling medium discharged through the discharge tube joint disposed on the second tube system;

a full level detection section that detects whether the cooling medium storage section is filled up with the cooling medium disposed in the cooling medium storage section; and a controller that controls drive of the medium circulator and switching operation of the flow path switch section, wherein the controller sets the flow path switch section to the flow path directed to the discharge tube joint after the cooling medium replacement cartridge has been attached; drives the medium circulator to circulate the cooling medium; circulates the cooling medium in the cooling medium replacement cartridge after the liquid level detection section has detected that the liquid level of the cooling medium discharged through the discharge tube joint is 0; sets the flow path switch section to the flow path directed to the cooling medium storage section after the full level detection section has detected that the cooling medium storage section is filled up with the cooling medium; and stops the drive of the medium circulator.

5. The electronic apparatus according to claim 1, wherein the electronic apparatus is a projector including, as a component to be cooled, an optical modulator that modulates a light beam emitted from a light source in accordance with image information to form an optical image.

6. A cooling medium replacement cartridge that is attached to an electronic apparatus including an apparatus main body and a casing for housing the main body, and further including, inside of the apparatus, a cooling unit that circulates a liquid cooling medium to cool components constituting the main body, the cooling medium replacement cartridge being used for replacing the cooling medium in the electronic apparatus with a new cooling medium, wherein the electronic apparatus including: a cooling medium storage section that is provided inside of the casing and stores the cooling medium; a first tube system that guides the cooling medium from the cooling medium storage section to the components to be cooled; a second tube system that sends back the cooling medium having been used for cooling the components to be cooled to the cooling medium storage section; and a medium circulator that is disposed on the first or second tube system in order to circulate the cooling medium through the cooling medium storage section, first tube system, and second tube system, wherein tube joints that are exposed to the outside of the casing, to which a cooling medium replacement cartridge used for replacing the cooling medium in the cooling medium storage section with a new cooling medium is connected, are provided in the first and/or second tube systems, and the cooling medium replacement cartridge includes: connecting sections to be connected to the tube joints exposed to the outside of the casing of the electronic apparatus; a first storage section that is connected to the connecting sections through tubes and stores the cooling medium sucked from the cooling medium storage section of the electronic apparatus; and a second storage section that is connected to the connecting sections through other tubes and stores a new cooling medium to be supplied to the electronic apparatus.

7. The cooling medium replacement cartridge according to claim 6, wherein the tube joints are disposed on the first or second tube system, and one of the tube joints serves as a discharge tube joint for discharging the cooling medium in the cooling medium storage section and the other serves as a supply tube joint for supplying the cooling medium storage section with a new cooling medium from the cooling medium replacement cartridge.

8. The cooling medium replacement cartridge according to claim 7, wherein the discharge tube joint is disposed on the upstream of a flow path relative to the supply tube joint.

9. The cooling medium replacement cartridge according to claim 8, comprising:

a flow path switch section that switches flow paths between a flow path directed to the cooling medium storage section and a flow path directed to the discharge tube joint disposed between the supply tube joint and discharge tube joint on the second tube system;

a liquid level detection section that detects the liquid level of the cooling medium discharged through the discharge tube joint disposed on the second tube system;

a full level detection section that detects whether the cooling medium storage section is filled up with the cooling medium disposed in the cooling medium storage section; and a controller that controls drive of the medium circulator and switching operation of the flow path switch section, wherein the controller sets the flow path switch section to the flow path directed to the discharge tube joint after the cooling medium replacement cartridge has been attached; drives the medium circulator to circulate the cooling medium; circulates the cooling medium in the cooling medium replacement cartridge after the liquid level detection section has detected that the liquid level of the cooling medium discharged through the discharge tube joint is 0; sets the flow path switch section to the flow path directed to the cooling medium storage section after the full level detection section has detected that the cooling medium storage section is filled up with the cooling medium; and stops the drive of the medium circulator.

10. The cooling medium replacement cartridge according to claim 6, wherein the electronic apparatus is a projector including, as a component to be cooled, an optical modulator that modulates a light beam emitted from a light source in accordance with image information to form an optical image.

* * * * *